(12) United States Patent
Westerhoff et al.

(10) Patent No.: US 12,316,699 B2
(45) Date of Patent: May 27, 2025

(54) FAST FILE SERVER METHODS AND SYSTEMS

(71) Applicant: PME IP PTY LTD, Richmond (AU)

(72) Inventors: Malte Westerhoff, Berlin (DE); Detlev Stalling, Berlin (DE)

(73) Assignee: PME IP PTY LTD, Richmond (AU)

( * ) Notice: Subject to any disclaimer, the term of this patent is extended or adjusted under 35 U.S.C. 154(b) by 0 days.

(21) Appl. No.: 18/424,607

(22) Filed: Jan. 26, 2024

(65) Prior Publication Data

US 2024/0236171 A1 Jul. 11, 2024

Related U.S. Application Data

(63) Continuation of application No. 18/070,391, filed on Nov. 28, 2022, now Pat. No. 11,902,357, which is a
(Continued)

(51) Int. Cl.
*H04L 67/06* (2022.01)
*G06F 16/13* (2019.01)
*G06F 16/182* (2019.01)
*G06F 21/62* (2013.01)
*H04L 9/40* (2022.01)
(Continued)

(52) U.S. Cl.
CPC .............. *H04L 67/06* (2013.01); *G06F 16/13* (2019.01); *G06F 16/183* (2019.01); *G06F 21/6209* (2013.01); *H04L 63/06* (2013.01); *H04L 63/20* (2013.01); *H04L 67/01* (2022.05);
(Continued)

(58) Field of Classification Search
CPC ......... H04L 67/06; H04L 67/20; H04L 67/01; H04L 67/1097; H04L 67/34; H04L 69/14; G06F 16/13; G06F 16/183; G06F 21/6209
See application file for complete search history.

(56) References Cited

U.S. PATENT DOCUMENTS 5,355,453 A * 10/1994 Row ................... G06F 16/1858
709/212
6,105,029 A * 8/2000 Maddalozzo, Jr. ... G06F 16/951
(Continued)

OTHER PUBLICATIONS

Higgins et al., Distributed System for Processing 3D Medical Images, Compat Biol Med (1997) 27, pp. 97-115.
(Continued)

*Primary Examiner* — Alina A Boutah
(74) *Attorney, Agent, or Firm* — SCI-LAW STRATEGIES PC

(57) ABSTRACT

The invention provides, in one aspect, an improved system for data access comprising a file server that is coupled to a client device or application executing thereon via one or more networks. The server comprises static storage that is organized in one or more directories, each containing, zero, one or more files. The server also comprises a file system operable, in cooperation with a file system on the client device, to provide authorized applications executing on the client device access to those directories and/or files. Fast file server (FFS) software or other functionality executing on or in connection with the server responds to requests received from the client by transferring requested data to the client device over multiple network pathways. That data can comprise, for example, directory trees, files (or portions thereof), and so forth.

20 Claims, 3 Drawing Sheets

Related U.S. Application Data continuation of application No. 17/380,874, filed on Jul. 20, 2021, now Pat. No. 11,516,282, which is a continuation of application No. 16/834,936, filed on Mar. 30, 2020, now Pat. No. 11,075,978, which is a continuation of application No. 16/036,438, filed on Jul. 16, 2018, now Pat. No. 10,686,868, which is a continuation of application No. 15/679,581, filed on Aug. 17, 2017, now Pat. No. 10,038,739, which is a continuation of application No. 15/384,822, filed on Dec. 20, 2016, now Pat. No. 9,860,300, which is a continuation of application No. 14/878,708, filed on Oct. 8, 2015, now Pat. No. 9,531,789, which is a continuation of application No. 14/279,755, filed on May 16, 2014, now Pat. No. 9,167,027, which is a continuation of application No. 13/755,366, filed on Jan. 31, 2013, now Pat. No. 8,775,510, which is a continuation of application No. 11/845,511, filed on Aug. 27, 2007, now Pat. No. 8,392,529.

(51) Int. Cl.
  *H04L 67/00* (2022.01)
  *H04L 67/01* (2022.01)
  *H04L 67/1097* (2022.01)
  *H04L 69/14* (2022.01)

(52) U.S. Cl.
  CPC .......... *H04L 67/1097* (2013.01); *H04L 67/34* (2013.01); *H04L 69/14* (2013.01)

(56) References Cited

U.S. PATENT DOCUMENTS

| | | | | |
|---|---|---|---|---|
| 6,384,821 B1* | 5/2002 | Borrel | ............. | H04N 21/25833 |
| | | | | 375/E7.012 |
| 6,765,570 B1 | 7/2004 | Cheung | | |
| 8,392,529 B2* | 3/2013 | Westerhoff | ............. | G06F 16/13 |
| | | | | 710/21 |
| 8,775,510 B2* | 7/2014 | Westerhoff | ............. | H04L 69/14 |
| | | | | 709/219 |
| 9,167,027 B2* | 10/2015 | Westerhoff | ......... | H04L 67/1097 |
| 9,860,300 B2* | 1/2018 | Westerhoff | ......... | H04L 67/1097 |
| 10,038,739 B2* | 7/2018 | Westerhoff | ............. | H04L 67/01 |
| 10,686,868 B2* | 6/2020 | Westerhoff | ......... | G06F 21/6209 |
| 10,762,872 B2 | 9/2020 | Westerhoff | | |
| 11,075,978 B2* | 7/2021 | Westerhoff | ............. | H04L 63/20 |
| 11,516,282 B2* | 11/2022 | Westerhoff | ........... | G06F 16/183 |
| 11,640,809 B2 | 5/2023 | Westerhoff | | |
| 11,763,516 B2 | 9/2023 | Westerhoff | | |
| 11,902,357 B2* | 2/2024 | Westerhoff | ............. | H04L 67/01 |
| 2002/0016813 A1* | 2/2002 | Woods | ................... | H04L 67/01 |
| | | | | 718/107 |
| 2002/0049825 A1* | 4/2002 | Jewett | ................... | H04L 69/329 |
| | | | | 709/215 |
| 2002/0165927 A1* | 11/2002 | Theriault | ................. | G06T 1/60 |
| | | | | 709/213 |
| 2004/0133652 A1* | 7/2004 | Miloushev | ......... | H04L 67/1019 |
| | | | | 707/999.009 |
| 2006/0149850 A1 | 7/2006 | Bowman | | |
| 2007/0067497 A1* | 3/2007 | Craft | ................... | H04L 67/1097 |
| | | | | 709/250 |
| 2008/0031238 A1* | 2/2008 | Harmelin | ........... | H04L 41/0843 |
| | | | | 370/389 |
| 2008/0052126 A1 | 2/2008 | Sasai | | |
| 2008/0208961 A1* | 8/2008 | Kim | ....................... | H04L 67/02 |
| | | | | 709/203 |
| 2009/0147793 A1* | 6/2009 | Hayakawa | ............. | H04L 45/04 |
| | | | | 370/401 |
| 2014/0173287 A1 | 6/2014 | Mizunuma | | |
| 2017/0032546 A1 | 2/2017 | Westerhoff | | |
| 2020/0327669 A1 | 10/2020 | Westerhoff | | |
| 2020/0366614 A1 | 11/2020 | Stalling | | |
| 2021/0256742 A1 | 8/2021 | Westerhoff | | |
| 2021/0352133 A1 | 11/2021 | Westerhoff | | |
| 2022/0165231 A1 | 5/2022 | Westerhoff | | |
| 2023/0195937 A1 | 6/2023 | Stalling | | |
| 2023/0260478 A1 | 8/2023 | Westerhoff | | |

OTHER PUBLICATIONS

AU2022200601, Office Action, dated Dec. 8, 2022, 4 pages.
AU2018335370, Office Action, dated May 15, 2023, 4 pages.
CA2991378, Office Action, dated Oct. 24, 2022, 7 pages.
CA2991378, Office Action, dated Oct. 20, 2023, 8 pages.
EP3329405, Summons, dated Jul. 7, 2023, 14 pages.
EP202303856_OA_Aug._23_2023, 7 pages.
JP2022-191827, Office Action, dated Oct. 18, 2023, 2 pages (& English translation).

* cited by examiner

FAST FILE SERVER METHODS AND SYSTEMS

PRIORITY CLAIM

This application is a continuation of (1) U.S. application Ser. No. 18/070,391 entitled "Fast File Server Methods and System", filed Nov. 28, 2022, which is a continuation of (2) Ser. No. 17/380,874 entitled "Fast File Server Methods and System", filed Jul. 20, 2021, which issued as U.S. Pat. No. 11,516,282 on Nov. 29, 2022, which is a continuation of (3) U.S. application Ser. No. 16/834,936 entitled "Fast File Server Methods and System", filed Mar. 30, 2020, which issued as U.S. Pat. No. 11,075,978 on Jul. 27, 2021, which is a continuation of (4) U.S. application Ser. No. 16/036,438 entitled "Fast File Server Methods and System", filed Jul. 16, 2018, which issued as U.S. Pat. No. 10,686,868 on Jun. 16, 2020, which is a continuation of (5) U.S. application Ser. No. 15/679,581 entitled "Fast File Server Methods and System", filed Aug. 17, 2017, which issued Jul. 31, 2017 as U.S. Pat. No. 10,038,739, which is a continuation of (6) Ser. No. 15/384,822 entitled "Fast File Server Methods and System", filed Dec. 20, 2016, which issued Jan. 2, 2018 as U.S. Pat. No. 9,860,300, which is a continuation of (7) U.S. application Ser. No. 14/878,708 entitled "Fast File Server Methods and System", filed Oct. 8, 2015 which issued Dec. 27, 2016 as U.S. Pat. No. 9,531,789, which is a continuation of (8) U.S. application Ser. No. 14/279,755 entitled "Fast File Server Methods and System", filed May 16, 2014, which issued Oct. 20, 2015 as U.S. Pat. No. 9,167,027, which is a continuation of (9) U.S. application Ser. No. 13/755,366 entitled "Fast File Server Methods and System", filed Jan. 31, 2013, which issued Jul. 8, 2014 as U.S. Pat. No. 8,775,510 which is a continuation of (10) U.S. application Ser. No. 11/845,511 entitled "Fast File Server Methods and System", filed Aug. 27, 2007 which issued Mar. 5, 2013 as U.S. Pat. No. 8,392,529, where the teachings of (1)-(10) are explicitly incorporated herein by reference in their entireties and for all purposes.

BACKGROUND OF THE INVENTION

The invention pertains to digital data processing and, more particularly, to methods and apparatus for accessing and/or delivering data in a client-server environment. The invention has application in improving file and data access over local area networks, the Internet, and other networks.

Traditional file servers or network attached storage (NAS) devices support access requests received from networked client devices (e.g., PCs, workstations and the like) using network file system capabilities built in to the server operating system—which may be, for example, Linux or Microsoft Windows Server. Typically, these file systems, e.g. SMB/CIFS, allow the clients to access files and directories maintained on the server as if they were local to the requesting clients themselves—albeit, the transfers take place via the network and, as a result, are traditionally much slower.

Thus, for example, file transfers from a NAS to a client device may be as slow as 10-50 Mbyte/s, even if Gigabit-Ethernet—which has a theoretical peak bandwidth of about 110 Mbyte/s—is used as the network. The discrepancy is more pronounced when actual transfer speeds of 10-50 Mbyte/s are measured against the read performance delivered by fast RAID systems of the type often attached to high-performance file servers. Those RAID systems are capable of delivering at rates of 200-300 MByte/s, or even higher for sufficiently large sequential reads.

Data input/output (I/O) performance is a critical component in data intensive applications such as, by way of non-limiting example, signal processing applications, visualization applications, and the like.

An object of the invention is to provide improved methods and systems for digital data processing and, more particularly, by way of non-limiting example, for accessing and/or delivering data in a client-server environment.

A related object of the invention is to provide such methods and systems as improve the speed of data transfer between file servers and client devices.

A still further related object of the invention is to provide such methods and systems as reduce the gap between high RAID performance and the performance usable at the application level, e.g., when a network is disposed in between.

SUMMARY OF THE INVENTION

The foregoing are among the objects attained by the invention which provides, in one aspect, an improved system for data access comprising a file server that is coupled to a client device via one or more networks. The server comprises static storage that is organized in one or more directories, each containing, zero, one or more files. The server also comprises a file system operable, in cooperation with a file system on the client device, to provide authorized applications executing on the client device access to those directories and/or files. Fast file server (FFS) software or other functionality executing on or in connection with the server responds to requests received from the client device or an application executing thereon (collectively, "client") by transferring requested data to the client in parallel over multiple network pathways. That data can comprise, for example, directory trees, files (or portions thereof), and so forth.

Related aspects of the invention provide systems as described above in which the server stores a configuration file that is accessible by authorized clients (e.g., authorized applications executing on the client device) and that identifies one or more network interfaces over which the requested data can be transferred. Further related aspects of the invention provide systems as described above in which the configuration file additionally contains one or more security keys that can be used by the client and the server in connection with a requested data transfer.

Yet still further related aspects of the invention provide systems as described above in which the file system of the server controls access to the configuration file by the client. Such control can be based, for example, on access permissions associated with the configuration file and with the executing application.

Still further aspects of the invention provide systems as described above in which the client (e.g., an application executing on the client device) requests access to the configuration file and, if successful, generates a request for further data on the server. According to related aspects of the invention, the application generates such a request along with one or more of the security keys provided in the configuration file. In further related aspects of the invention, the application generates such a request on one or more network interfaces identified in that file. As noted above, the further data that is the subject of such a request can comprise, for example, directory trees, files (or portions thereof), and so forth.

Further aspects of the invention provide systems as described above in which the FFS functionality executing on (or in connection with) the server listens for requests on network interfaces identified in the configuration file. According to further related aspects of the invention, it listens only on those network interfaces that are connected to physically independent networks. Still further related aspects of the invention provide systems as described above in which the FFS functionality uses security keys provided with requests to validate those requests.

According to still further aspects of the invention, the FFS functionality responds to requests received from the client device by transferring requested data with the client via the multiple network connections over which those requests were received.

Further aspects of the invention provide systems as described above in which the server is coupled to multiple client devices via one or more networks. In such systems, the server responds to requests received from each client device by transferring requested data to that client device over multiple network pathways. According to related aspects of the invention, the configuration file specifies a different subset of network interfaces for each client (e.g., each client device and/or application executing thereon).

Still other aspects of the invention provide methods for transferring data between a server and one or more client devices paralleling the foregoing.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE INVENTION

Architecture

Figure 1:
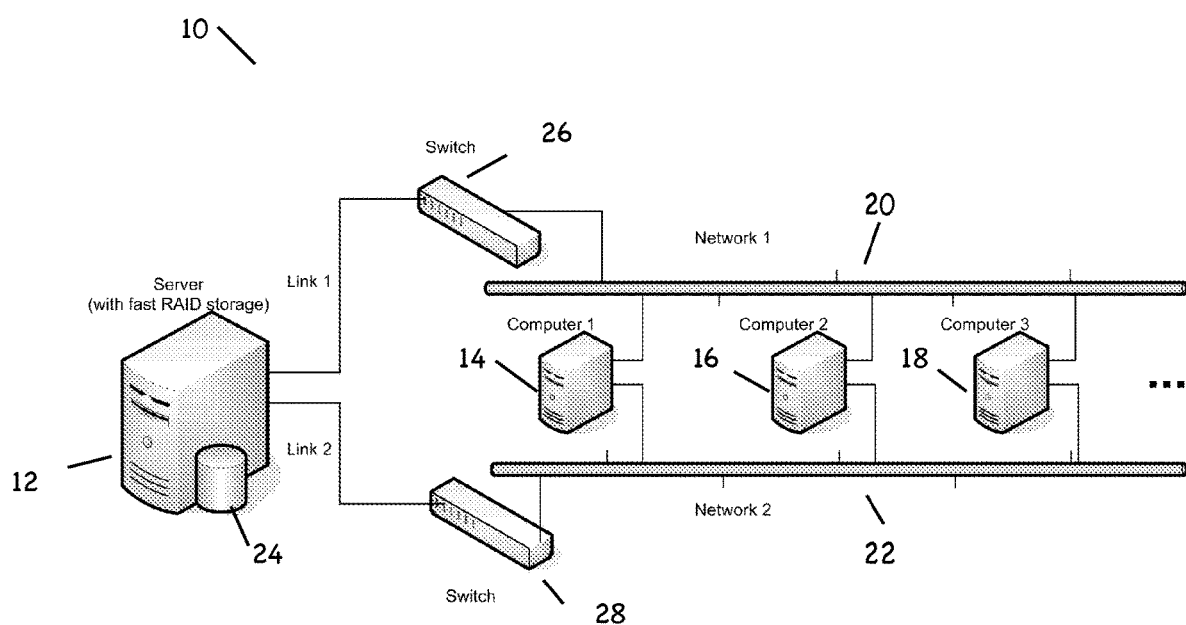
FIG. 1 depicts a digital data processing system according to the invention.
Figure 2:
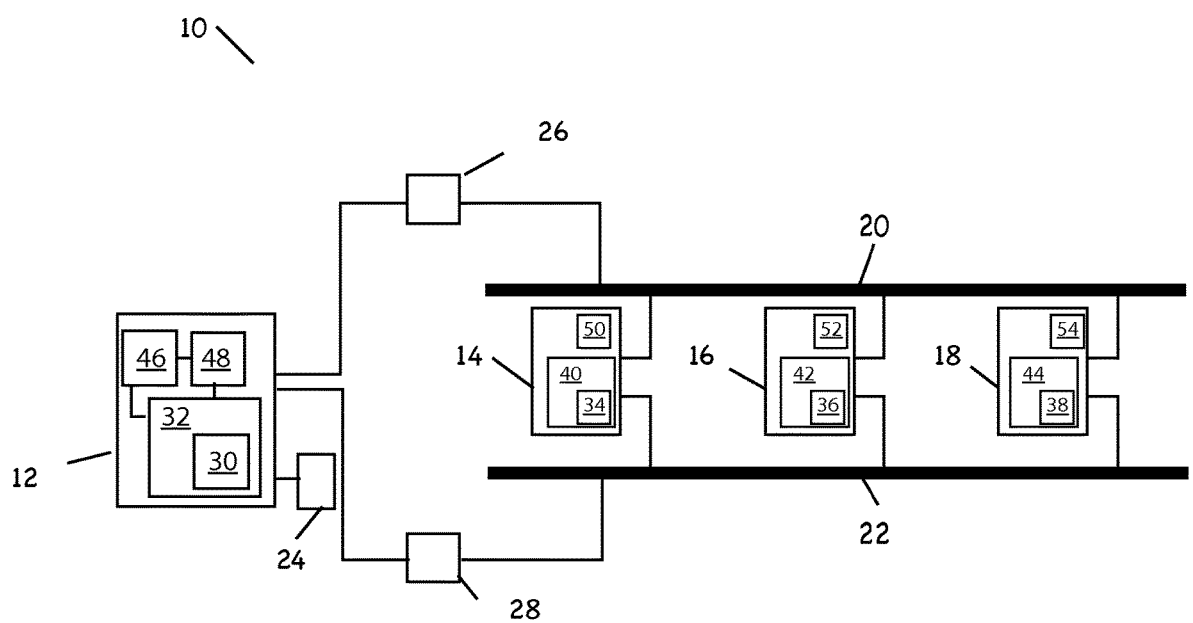
FIG. 2 is a further depiction of the digital data processing system of FIG. 1.

FIGS. 1 & 2 depict a digital data processing system 10 according to the invention. The system includes a file server 12 that is coupled to a client device 14 and, more typically, multiple client devices 14-18 via a network 20 and, more typically, multiple networks 20-22.

Server 12 may comprise a conventional file server and/or network attached storage (NAS) (collectively, "server" or "file server") of the type conventionally known in the art, as adapted in accord with the teachings hereof. Although only one server is shown in the drawing, it will be appreciated that the invention can be practiced with more such servers.

The server includes static storage that maintains user, application, enterprise or other data organized in the conventional manner known in the art—here, in one or more directories, each containing, zero, one or more files. In other embodiments, such data may be organized as serialized objects and/or in other manners known in the art. Storage device 24 typically comprises one or more disk drives (as shown) and, preferably, one or more high-speed RAID devices—though, in other embodiments, tape drives, ROM, RAM, Flash Memory, and/or CD-ROM devices may be used instead or in addition. Regardless, such storage device(s) 24 are of the type conventionally known in the art as adapted in accord with the teachings hereof.

The server 12 also comprises a file system 30 that forms part of and/or cooperates with a native operating system 32. Both of these components are of the type conventionally known in the art, as adapted in accord with the teachings hereof. Thus, for example, operating system 32 may comprise Linux or Microsoft Windows Server, both by way of non-limiting example and, file system 30 may comprise NTFS, EXT3, or XFS, again, by way of non-limiting example and by be exported by the operating system using a protocol such as SMB/CIFS or NFS, again, by way of non-limiting example. By way of said export protocols the file system 30 operates in cooperation with file systems 34-38 (discussed below) on the client devices 14-18 to provide authorized applications executing on the client device access to those directories and/or files.

Server 12 further comprises a fast file server (FFS) module 46—here, embodied in software executing on server 12, but in other instantiations embodied in hardware executing in conjunction with server 12—that responds to requests received from a client device 14-18 by transferring requested data (e.g., directory trees, files (or portions thereof), and so forth) with that client device over multiple networks 20-22.

Server 12 further comprises one or more configuration files 48 that store identities of one or more network interfaces over which the clients devices 14-18 may request data transfers. In preferred embodiments, the configuration file(s) 48 additionally store one or more security keys that can be used to validate and/or identify each requested data transfer. In the illustrated embodiment, the configuration files 38 are maintained in the conventional manner on storage unit 24, though, in other embodiments they may be stored elsewhere. The file(s) 48 may be text-based (e.g., XML), binary, or otherwise.

In the illustrated embodiment, file system 30 of the server 12 controls access to the configuration file(s) 48 in the conventional manner, e.g., using permissions (or other access controls) set so that only authorized users or applications (hereinafter, collectively, applications) executing on the client devices 14-18 can access the file(s) 48.

Networks 20-22 comprise local area networks (LANs), wide area networks (WANs), metropolitan area networks (MANs), or other networks of the type commonly known in the art supporting communications between client and server devices (and including conventional infrastructure, such as switches 26-28). These may be based in the Internet Protocol (IP) or other protocols, and they may include wireless, wired, satellite and/or other communication mechanisms of the type known in the art. The networks 20-22 may of the same variety (e.g., both megabit Ethernet, by way of non-limiting example) or of mixed varieties (e.g., megabit Ethernet and conventional Ethernet, again, by way of non-limiting example). Though two such networks are shown in the illustration, the invention contemplates a greater or lesser number thereof.

Client devices 14-18 comprise personal computers, workstations, embedded processors, single-board computers, personal digital assistants or other digital data processing device conventional in the art capable of cooperating in a client-server network and of executing software (here, referred to as "applications" or "software applications") requiring access to storage unit 24. In the illustrated embodiment, those devices are remotely disposed from the server 12 and coupled for communications with it via network media 20-22 operating in accord with the TCP/IP protocol.

In other embodiments, one or more of the client devices 14-18 are coupled with the sever 12 via a combination of network media (e.g., Ethernet and so forth) as well as via direct wired or wireless media (e.g., USB interconnect, firewire interconnect, Bluetooth, infrared, and so forth). Those applications, labeled 50-54, respectively, executing on the respective client devices may comprise signal processing applications, visualization applications, and so forth. The client devices 14-18 may be of the same and/or mixed varieties. And, though shown in the drawing coupled to server 12 via a common set of networks 20-22, may be so coupled on sets of disparate (and/or, possibly overlapping) networks.

Like server 12, client devices 14-16 comprise respective file systems 34-38 that form part of and/or cooperate with respective native operating system 40-44. These, too, are of the type conventionally known in the art, as adapted in accord with the teachings hereof. Thus, for example, operating systems 40-44 may comprise Linux or Microsoft Windows XP, both by way of non-limiting example; and, file systems 34-38 may comprise SMB/CIFS or NFS clients, again, by way of non-limiting example.

Operation

Figure 3:
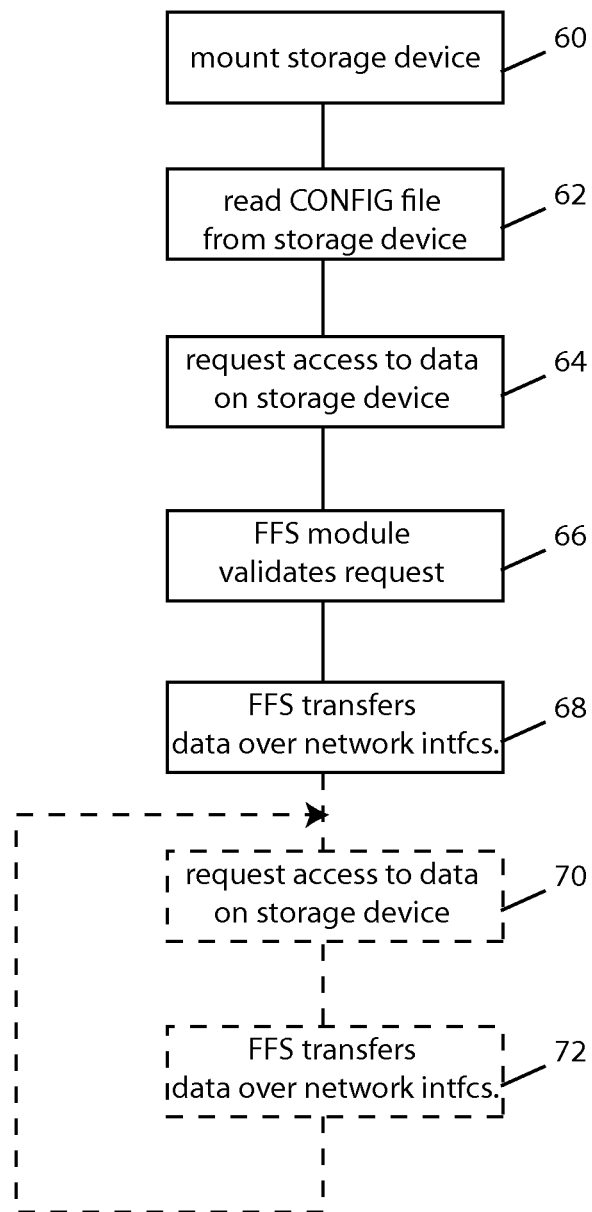
FIG. 3 depicts a method of operation of the system of FIG. 1.

FIG. 3 depicts operation of the system 10 in connection with a client request for access to storage 24. Although the discussion focuses on requests by application 50 of device 14, it will be appreciated that requests by other applications and/or devices (collectively, "clients") proceed similarly.

In step 60, client device 14 mounts storage device 24 (or a volume therein) as a "share" (in Windows terminology) or otherwise. This can be effected by a user of device 14, application 50 executing thereon and/or by the operating system 40 (e.g., as part of a start-up routine), though for purposes of the discussion that follows, mounting will be assumed to be effected by the application 50. Mounting proceeds in the conventional manner, as mediated by the operating system 40, file system 34 of the client device, and file system 30 of the server. Per convention, any and/or all of these may prohibit mounting unless the requesting user and/or application 50 has appropriate security permissions.

Assuming mounting is successful, client application 50 requests access to configuration file 48 on storage device 24. See step 62. In the illustrated embodiment, this is for READ access to the file 48, though, other embodiments may provide for WRITE, LOCK, or other access to that file 48. Regardless, processing of the request for (read) access proceeds in the conventional manner, as mediated by the operating system 40, file system 34 of the client device 14, and file system 30 of the server. As above and per convention, any and/or all of these may prohibit access unless the requesting user and/or client application 50 has appropriate security permissions.

Assuming access to file 48 is granted, the client application 50 obtains from that file 48 identifications of network interfaces (e.g., ports) and security keys. The client application 50 then generates a request for access to data (e.g., a directory tree, file or portion thereof) using those IDs and keys. See step 64. In the discussion that follows, this is assumed to be a request for READ access, although, requests for OPEN, CLOSE, SEEK, WRITE, DELETE FILE, RENAME FILE, MOVE FILE, and so forth, access are similarly handled. The commands are issued in the conventional ordering (e.g., READ, WRITE OR CLOSE following OPEN) and can specify a previously opened file or a file name.

Although, in some embodiments, the access request of step 62 can be made via the respective file systems 40, 34, in the illustrated embodiment, that request is made directly by client application 50 to the FFS module 46 of the server 12. To this end, the protocol for communications between the client application 50 and FFS module 46 can be simpler and/or more specialized than traditional file system access requests, thereby facilitating higher performance than standard network file systems. Moreover, that protocol can be implemented on top of physical or logical network layers which are not supported in a straight forward way by standard network file systems. An example is DAPL on INFINIBAND$^{SM}$ networks.

The request specifies the data structure (e.g., directory tree, file, etc.) to be accessed, as well as the security keys (identified in the configuration file 48) for identifying and validating the request. In the illustrated embodiment, the request is transferred, in parallel, over each network interface (identified in the configuration file 48) over which the client application 50 specifies access to occur, though, in other embodiments, the request may be transmitted by remote procedure call (RPC), COM, DCOM, CORBA or otherwise, and may include identifiers for each such network interface.

In step 66, the FFS module 46—which, in the illustrated embodiment, listens for requests on network interfaces identified in the configuration file 48—validates the request received in step 64. This includes verifying that the security keys provided in the request are valid, that the application 50 has permission (per the file system 34) for access to the requested data (e.g., directory tree and/or file) and that network interfaces specified for the request are available for the transfer. In some embodiments, the FFS module 46 listens for and/or validates requests only for transfers on physically independent networks. In some embodiments, the FFS module 46 can implement validation independently of the file system 32. In other embodiments, it utilizes the operating system 32 and file system 30 for at least some of these purposes.

Assuming the FFS module 46 validates the request, the module 46 mediates the data transfer as between the storage device 24 (via the server's file system 32) and the client application 50 (via the specified interfaces to networks 20-22). For example, in the case of a READ operation, the FFS module obtains the requested data (e.g., file blocks or directory tree) and transmits it to the application 50 concurrently over the multiple network pathways specified by those interfaces. See step 68. Thus, typically, for example, the FFS module transmits the requested data to the client application 50 over two or more separate networks 20, 22; however, it may (depending on the specified interfaces) send the data over two separate channels on the same network (e.g., as where per-channel bandwidth is rate-limited). In the case of WRITE or other operations, the FFS exchanges the requisite information with the client application 50 over those interfaces and duly writes it to the storage device 24.

Once the FFS module 46 has validated access to a given file, directory tree and so forth, the application 50 may continue making requests (e.g., successive read or write requests) without further validation. This is reflected in steps 70-72.

Although the discussion focuses on responses by FFS module 46 to requests from client application 50 executing on device 14, the module 46 responds similarly to other applications on that device 14, as well as to other applications on other devices 16-18. Thus, the FFS module 46 of the illustrated embodiment responds to requests received from each such client by transferring requested data to that client over multiple network interfaces—and, therefore, network pathways—specified in the request. These may be common sets of pathways, partially overlapping sets of pathways, or entirely disparate sets of pathways.

EXAMPLE

An example of an implementation of system 10 for medical visualization is as follows. In the implementation described here, the client devices 14-18 are presumed to be visualization servers, which process large medical image studies stored on the file server 12. Upon selection of a study by a user, the data has to be loaded as fast as possible to minimize waiting time.

FFS module 46 is implemented as a process (e.g. a Windows™ service) running on file server 12, subsequently referred to as "Service." Upon startup, the Service writes a file (configuration file 48) into each directory tree to be "exported," i.e., available for access by a client device 14-18. Those directory trees are exported as standard Microsoft Windows Shares. The configuration file 48 has read permissions which are as restrictive as the most restrictive read permissions of any of the files in that directory tree. The configuration file 48 contains an access key randomly generated by the Service, as well as IP addresses of the network interfaces of the file server and the TCP/IP port on which the Service listens for incoming connections.

Each client device 14-18 which has access to the Windows Share and has permission to read the configuration file 48 can use the FFS module 46 for fast file transfer. It connects to the network interfaces and port specified in the configuration file 48. It transmits the contents of the access key (thereby proving that it had read permission to the configuration file 48). On the connection linked to each of the network interfaces the same session key is transmitted, thereby associating these links with one logical connection.

A data read command is satisfied by the Service using multiple simultaneous threads and double buffering. One thread reads the data from the disk 24 or RAID device. One thread per network interface transmits the data. Thereby effectively parallelizing disk read and concurrent data transmission on all network interfaces.

CONCLUSION

Described above are systems and methods meeting the aforesaid objects, among others. It will be appreciated that the embodiments shown and described herein are merely examples of the invention and that other embodiments incorporating changes therein fall within the scope of the invention. Thus, by way of non-limiting example, it will be appreciated that the invention can be practiced with peer-to-peer networks, grid networks and so forth, wherein the role of "server" is played by a set of one or more devices in such networks and the role of "client" is played by a set (possibly overlapping) of one or more (other) devices in the network.

What is claimed is:

1. An apparatus comprising:
   (a) a server device comprising a storage device, a digital data processor, and a first file system, where a FFS (Fast File Server) software executing on the digital data processor, where the storage device comprises one or more directories, each containing, one or more files, where a configuration file is stored on the one or more directories of the storage device, where the FFS software alone validates a first client device independent of the first file system, where the FFS software is adapted to cooperate with the first client device to provide an access information to an authorized application executing on the first client device, where the access information comprises the one or more directories and/or the one or more files;
   (b) a plurality of networks in communication with the storage device; and
   (c) a plurality of network interfaces, where each network interface of the plurality of network interfaces is physically independent of each other network interface of the plurality of network interfaces, where the configuration file comprises: the access information for identifying at least two network interfaces from the plurality of network interfaces, where the FFS software responds to a first request received from the first client device by transferring the access information to the first client device, where the FFS software responds to a second request received from the first client device by transferring data to the first client device in parallel over the at least two network interfaces, where the at least two network interfaces are physically independent of each other.

2. The apparatus of claim 1, where the second request is received over the at least two network interfaces.

3. The apparatus of claim 1, where the first client device is validated as an authorized client.

4. The apparatus of claim 3, where the authorized client comprises the authorized application executing on the first client device.

5. The apparatus of claim 1, where the access information enables the first client device to receive data concurrently over the at least two network interfaces.

6. The apparatus of claim 1, where the configuration file specifies a different subset of network interfaces from the plurality of network interfaces for a second client device.

7. The apparatus of claim 1, where at least one of the plurality of networks comprises a local area network.

8. An apparatus comprising:
   (a) a server device comprising a storage device, a digital data processor, and a first file system, where a FFS (Fast File Server) software executing on the digital data processor, where the storage device comprises one or more directories, each containing, one or more files, where a configuration file is stored on the one or more directories of the storage device, where the first file system and the FFS software are adapted to validate a first client device, where the FFS software and/or the first file system are adapted to cooperate with the first client device to provide an access information to an authorized application executing on the first client device, where the access information comprises the one or more directories and/or the one or more files;
   (b) a plurality of networks in communication with the storage device; and
   (c) a plurality of network interfaces, where each network interface of the plurality of network interfaces is physically independent of each other network interface of the plurality of network interfaces, where the configuration file comprises: the access information for identifying at least two network interfaces from the plurality of network interfaces, where the FFS software responds to a first request received from the first client device by transferring the access information to the first client device, where the FFS software responds to a second request received from the first client device by transferring data to the first client device in parallel over the at least two network interfaces, where the at least two network interfaces are physically independent of each other.

9. The apparatus of claim 8, where the second request is received over the at least two network interfaces.

10. The apparatus of claim 8, where the first client device is validated as an authorized client.

11. The apparatus of claim 10, where the authorized client comprises the authorized application executing on the first client device.

12. The apparatus of claim 8, where the access information enables the first client device to receive data concurrently over the at least two network interfaces.

13. The apparatus of claim 8, where the configuration file specifies a different subset of network interfaces from the plurality of network interfaces for a second client device.

14. The apparatus of claim 8, where at least one of the plurality of networks comprises a local area network.

15. An apparatus comprising:
(a) a server device comprising a storage device, a digital data processor, and a first file system, where a FFS (Fast File Server) software executing on the digital data processor, where the server device cooperates with an operating system, where the storage device comprises one or more directories, each containing, one or more files, where a configuration file is stored on the one or more directories of the storage device, where the FFS software in combination with the first file system and the operating system are adapted to validate a first client device, where the FFS software and/or the first file system are adapted to cooperate with the first client device to provide an access information to an authorized application executing on the first client device, where the access information comprises the one or more directories and/or the one or more files;
(b) a plurality of networks in communication with the storage device; and
(c) a plurality of network interfaces, where each network interface of the plurality of network interfaces is physically independent of each other network interface of the plurality of network interfaces, where the configuration file comprises: the access information for identifying at least two network interfaces from the plurality of network interfaces, where the FFS software responds to a first request received from the first client device by transferring the access information to the first client device, where the FFS software responds to a second request received from the first client device by transferring data to the first client device in parallel over the at least two network interfaces, where the at least two network interfaces are physically independent of each other.

16. The apparatus of claim 15, where the second request is received over the at least two network interfaces.

17. The apparatus of claim 15, where the first client device is validated as an authorized client.

18. The apparatus of claim 17, where the authorized client comprises the authorized application executing on the first client device.

19. The apparatus of claim 15, where the access information enables the first client device to receive data concurrently over the at least two network interfaces.

20. The apparatus of claim 15, where the configuration file specifies a different subset of network interfaces from the plurality of network interfaces for a second client device.

* * * * *